Nov. 28, 1950 W. M. GOODALL 2,531,846

COMMUNICATION SYSTEM EMPLOYING PULSE CODE MODULATION

Filed March 13, 1947 6 Sheets-Sheet 1

INVENTOR
W. M. GOODALL
BY George C. Tod
ATTORNEY

Nov. 28, 1950 W. M. GOODALL 2,531,846

COMMUNICATION SYSTEM EMPLOYING PULSE CODE MODULATION

Filed March 13, 1947 6 Sheets-Sheet 2

INVENTOR
W. M. GOODALL
BY George C. Lord
ATTORNEY

Nov. 28, 1950 W. M. GOODALL 2,531,846

COMMUNICATION SYSTEM EMPLOYING PULSE CODE MODULATION

Filed March 13, 1947 6 Sheets-Sheet 3

INVENTOR
W. M. GOODALL
BY George C. Lord
ATTORNEY

INVENTOR
W. M. GOODALL
BY George C. Lord
ATTORNEY

COMMUNICATION SYSTEM EMPLOYING PULSE CODE MODULATION

Filed March 13, 1947 6 Sheets-Sheet 5

INVENTOR
W. M. GOODALL
BY George C. Lord
ATTORNEY

COMMUNICATION SYSTEM EMPLOYING PULSE CODE MODULATION

Filed March 13, 1947 6 Sheets-Sheet 6

INVENTOR
W. M. GOODALL
BY
George C. Ford
ATTORNEY

Patented Nov. 28, 1950

2,531,846

UNITED STATES PATENT OFFICE 2,531,846

COMMUNICATION SYSTEM EMPLOYING PULSE CODE MODULATION

William M. Goodall, Oakhurst, N. J., assignor to Bell Telephone Laboratories, Incorporated, New York, N. Y., a corporation of New York Application March 13, 1947, Serial No. 734,372

7 Claims. (Cl. 179—1.5)

This invention relates to communication systems, and more particularly to pulse type communication systems in which the information is conveyed by code groups of pulses. In a specific embodiment of the invention code groups of pulses are employed to convey information relative to the instantaneous amplitude of a speech, telegraph, or other complex wave. The code combinations are sent in rapid succession, thus indicating the instantaneous amplitude of the complex wave at successive instants of time.

In the systems of the prior art the pulse code groups are transmitted over ultra-high frequency or microwave transmission paths and systems, the pulse code group comprises pulses of current or no-current. In other words, a high frequency oscillator is turned on and off to form the pulses of each of the pulse code groups. As a result, the amount of time the oscillator is turned on varies from code group to code group, with the result that the carrier frequency may shift appreciably which frequently causes trouble.

It is an object of the present invention to provide an improved coding arrangement and method for coding code groups of pulses so that substantially the same duty cycle is maintained on the high frequency oscillator for all of the different code groups of pulses. In order to secure this result, the same number of pulses is transmitted for each code group. However, each of the pulses of each of the code groups may occupy any one of two discrete portions of the time interval assigned to the respective pulse. If the pulse occupies one position, it will be equivalent to a current pulse in the previous systems and represent a marking condition, while if the pulse occupies another position in the time interval it will be equivalent to a no-current pulse in the previous systems and represent a spacing condition.

The coding method and arrangement in accordance with this invention may be employed to control transmission of a frequency modulation transmission system including such a system operating in the ultra-high frequency or microwave frequency regions.

From a slightly different viewpoint the resulting pulses transmitted may be thought of as comprising two separate code groups one the compliment or converse of the other and both occupying the same code group interval. That is, only one pulse is present in any pulse interval for the combined two code groups.

Due to the fact that the energy of each code group of on and off pulses bears some relationship to the instantaneous amplitude of the speech or other complex wave at the recurring instants of time, it is possible at least on occasion to understand the speech being transmitted from the pulse code groups without decoding.

In accordance with the present invention, there exists no energy relationship between the energy of the code groups of pulses and the amplitude of the speech wave at the instants of time in question. As a result, since substantially the same amount of energy is conveyed in each of the code groups transmitted, the arrangement in accordance with this invention provides a more private means of communication, in which the chances that unauthorized persons who may intercept the communications will be able to understand any of them is greatly reduced. Further, the transmission of substantially the same energy during each code group, in addition to improving the operation of the associated microwave oscillator, tends to reduce distortion of the pulses due to the time constants of the transmission paths, coupling networks, etc. through which the pulses are transmitted because the average power, potential or current, as applied to the tubes and circuits is substantially the same for all code groups.

A further object of this invention is to provide an improved and simplified decoding arrangement which reconstructs the complex wave at the receiving station in response to the pulse code groups of the type described above.

Still another object of this invention relates to an improved coding arrangement for deriving a permutation code representing the magnitude of each sample and thus the amplitude of the complex wave at the sampling instants of time.

Briefly, in accordance with an exemplary embodiment of the present invention, equipment is provided for sampling an incoming complex wave at rapidly recurring instants of time, as for example, at a rate of 8,000 times a second and storing a charge on a condenser the magnitude of which is a function of the incoming complex wave.

Means are also provided for generating a step wave form, each step of which is exponentially related to the adjacent steps. One such wave form is generated for each of the samples of the complex wave. The complex wave form is then added to the charge stored upon the sampling condenser and when the sum of these two quantities exceeds a predetermined amount there is generated a current or "on" pulse. So long as the sum of the exponential wave form and the magnitude of the sample does not exceed a predetermined quantity, no current pulse is generated which condition is termed an "off" pulse. When the combined sum of the charge on the sampling condenser and the exponential wave form exceeds the predetermined reference value, the pulse of current generated is employed to decrease the charge on the storing condenser by an amount equal to the amount of charge or instantaneous amplitude of the complex wave represented by the generated pulse. Thereafter, the remaining charge on the condenser is added to the exponential wave form and the above process repeated.

Thus, it is apparent that a binary permutation code group of pulses is generated representing the magnitude of the sample derived from the incoming speech or other complex wave. This group comprising pulses each of either one or the other of two different characteristics is generated for each of the samples obtained. The number of code elements or pulses for each sample is fixed in the same for all of the samples, but the character of each of the pulses varies under the control of the amplitude of the sample in the manner described above. It is apparent that each of the pulses of any code group representing a given sample represents a fixed portion of the total possible amplitude of the sample. Thus, the first pulse represents half the total possible magnitude of the sample. If the sample exceeds one half of the total possible magnitude, a pulse of one character such as a current pulse, as described above, is generated to convey this information. If the sample does not exceed the half-amplitude, a spacing pulse, represented in the first instance by the absence of current, during the first pulse interval is employed to represent this condition. When a current pulse is generated in response to a sample exceeding half the total possible magnitude, the charge on the condenser is reduced by an amount equal to half the total possible magnitude of the charge which can be stored upon the condenser. Thereafter the process is repeated for each of the succeeding pulses of the code group and then the entire process is repeated for the succeeding sample and a succeeding code group of pulses is generated as representing the magnitude of the succeeding sample.

In the output of the coder as described above, the two signaling conditions required of the binary code which may be termed marking and spacing are represented by on or off pulses, that is, the presence or absence of current pulses in the respective code element intervals. The next process in the system of the invention is to translate each of these code groups into a code group in which a current pulse is present in each code element interval. In this new code group, the marking and spacing conditions are represented by the time or position in each code element interval at which the pulse occurs. Such a code may be termed a time modulated code as compared to the amplitude modulated or keyed code of on-off pulses. In converting from the latter code to the time modulated code, an "on" pulse of the key code will appear as a pulse in one position or time interval of the new codes and an "off" pulse, as a pulse in a different position or time. In the illustrative embodiment described herein, an on or current pulse of the first type of code is represented in the time modulated code as pulse in a later portion of the code element interval, and an off or no current flow is represented by a pulse occurring in an earlier portion of the code element interval. Thus, in converting from the first to the second code, the on pulses are simply delayed by the desired fraction of the code element interval to produce marking pulses in the time modulated code. The spacing pulses are produced by generating a series of pulses concurring in each code element interval at the same time as the pulses of the on-off code and supplying them to a comparator or gating circuit to which the pulses of the on-off code are also supplied. The presence of an on pulse will prevent the transmission of a pulse of this series, while in the absence of a pulse, that is, an off pulse condition, a pulse of the series will be transmitted. Obviously, the time modulated code is not limited to this particular arrangement and marking and spacing conditions may be represented by pulses in the first and second portion of the interval respectively, if desired.

The pulses in the second code group are then applied to the radio or other high frequency transmission path for transmission to a distant station. Inasmuch as the same number of current pulses are transmitted for each code group and thus for each small period of time, a substantially constant duty cycle is imposed upon the high frequency oscillator tube so that the frequency of the tube will be substantially constant and thus permitting of more accurate reception than in the case in which the first code group of pulses is applied to the radio transmitting system.

The foregoing and other objects and features of this invention, the novel features of which are specifically pointed out in the claims appended hereto, may be more readily understood by reference to the following description of an exemplary embodiment thereof when read with reference to the attached drawings, in which:

Figures 1, 2, 7:
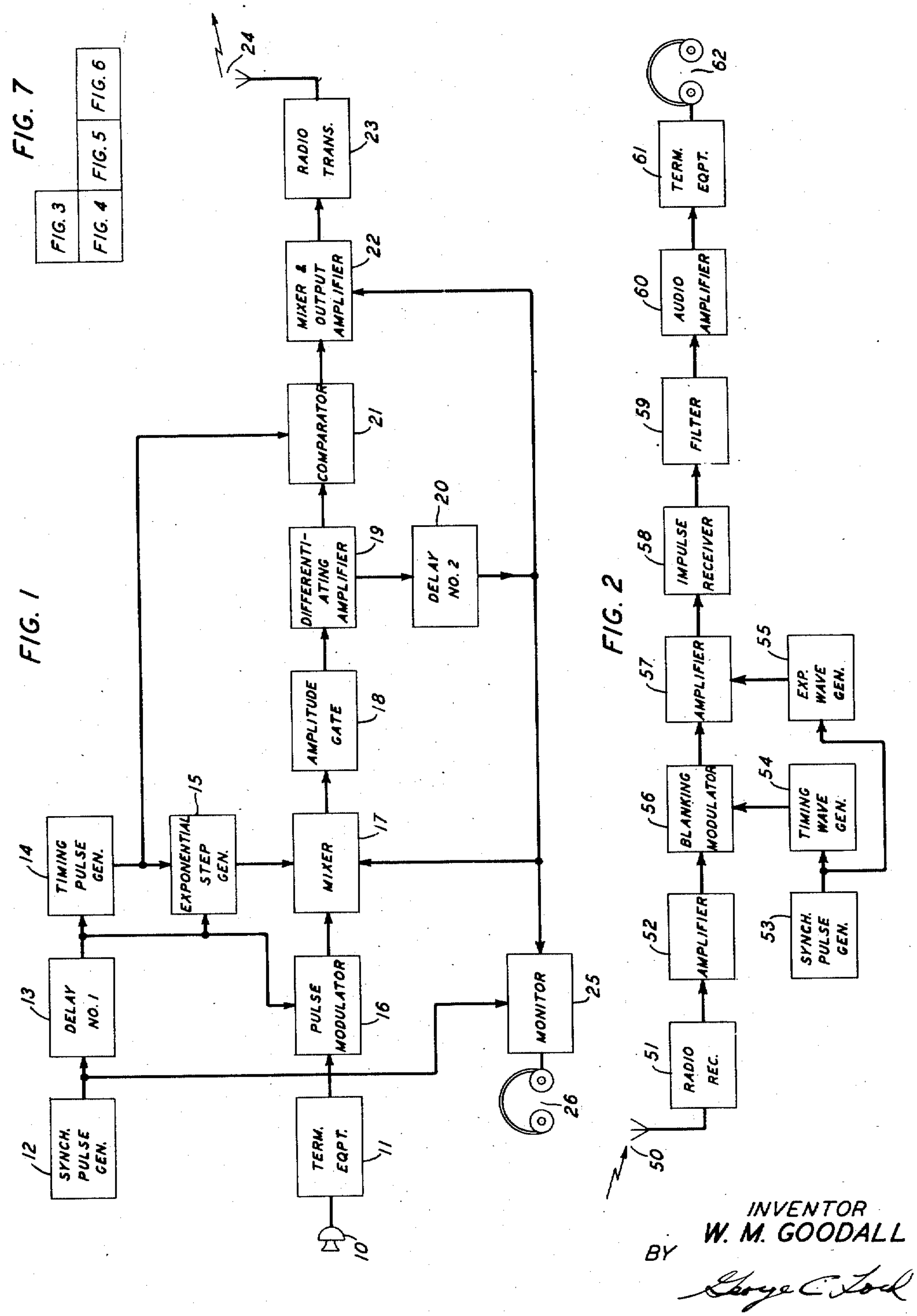
Fig. 1 shows in block form the various elements of applicant's improved transmitting arrangement and the manner in which they cooperate one with another.
Fig. 2 shows a corresponding block diagram of the elements of the receiving equipment in the manner in which they cooperate to decode the received pulses and reconstruct from them a wave having substantially the same wave form as the complex wave applied to the system at the transmitting station.

Figs. 3 through 6, inclusive, when arranged as shown in Fig. 7 show the circuit details of an exemplary embodiment of the present invention.

Figure 3:
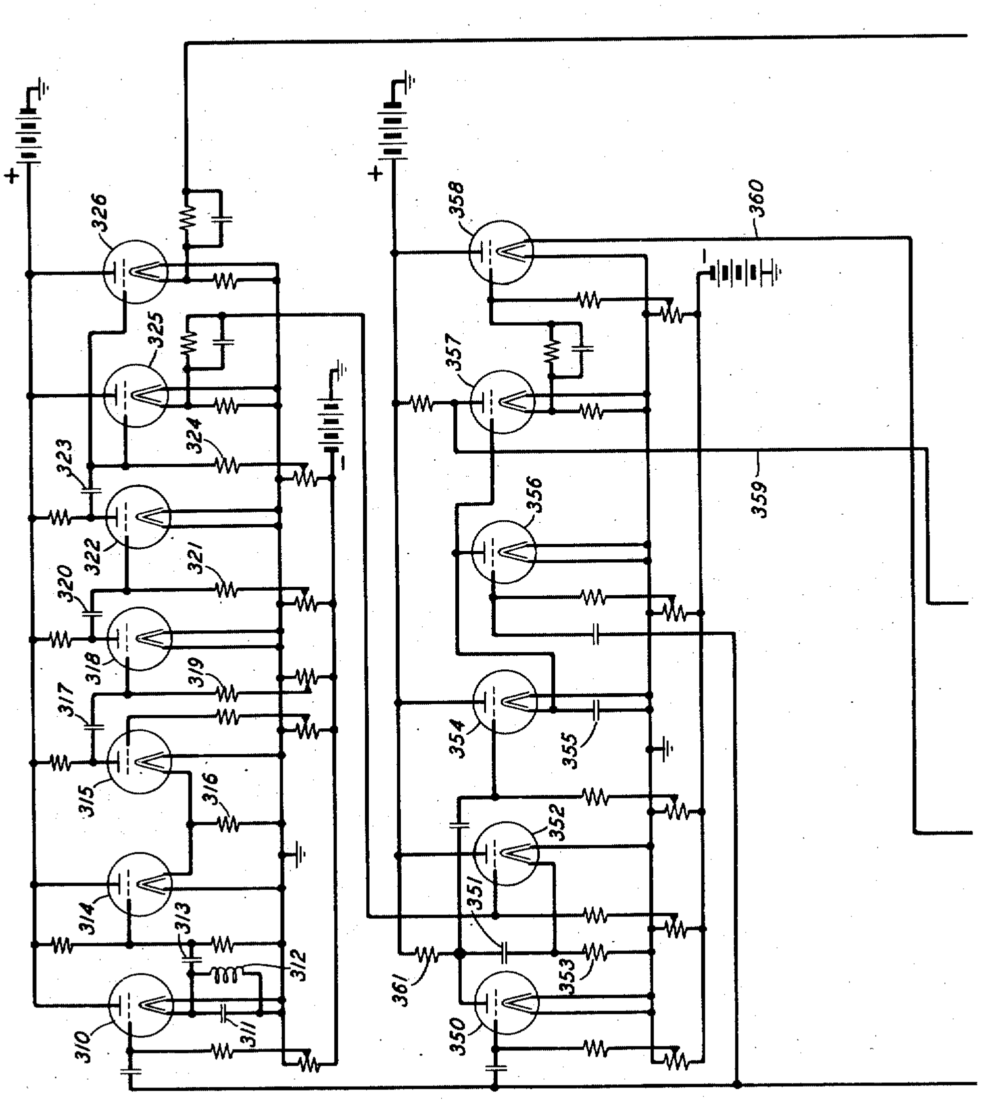
Figure 4:
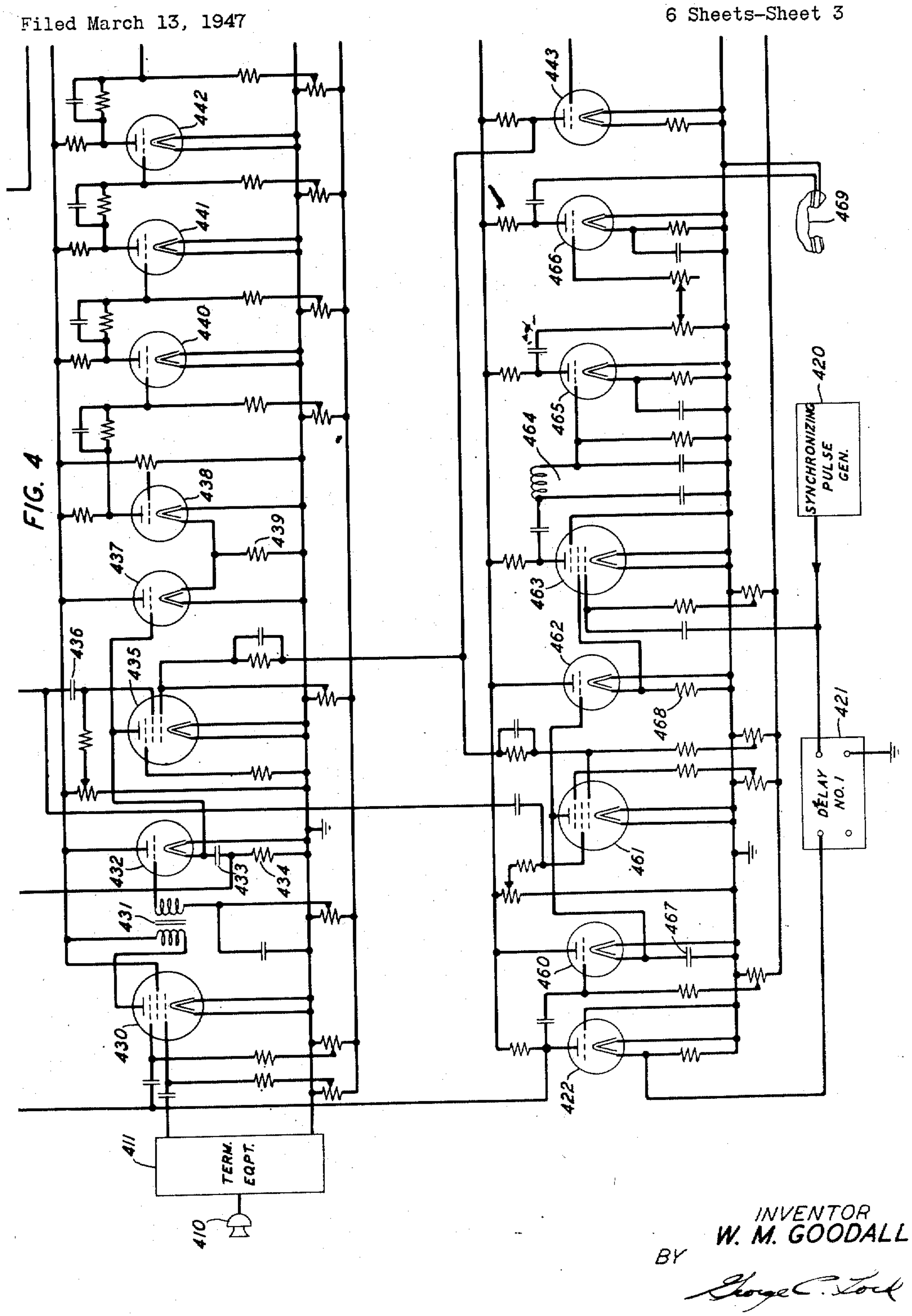
Figure 5:
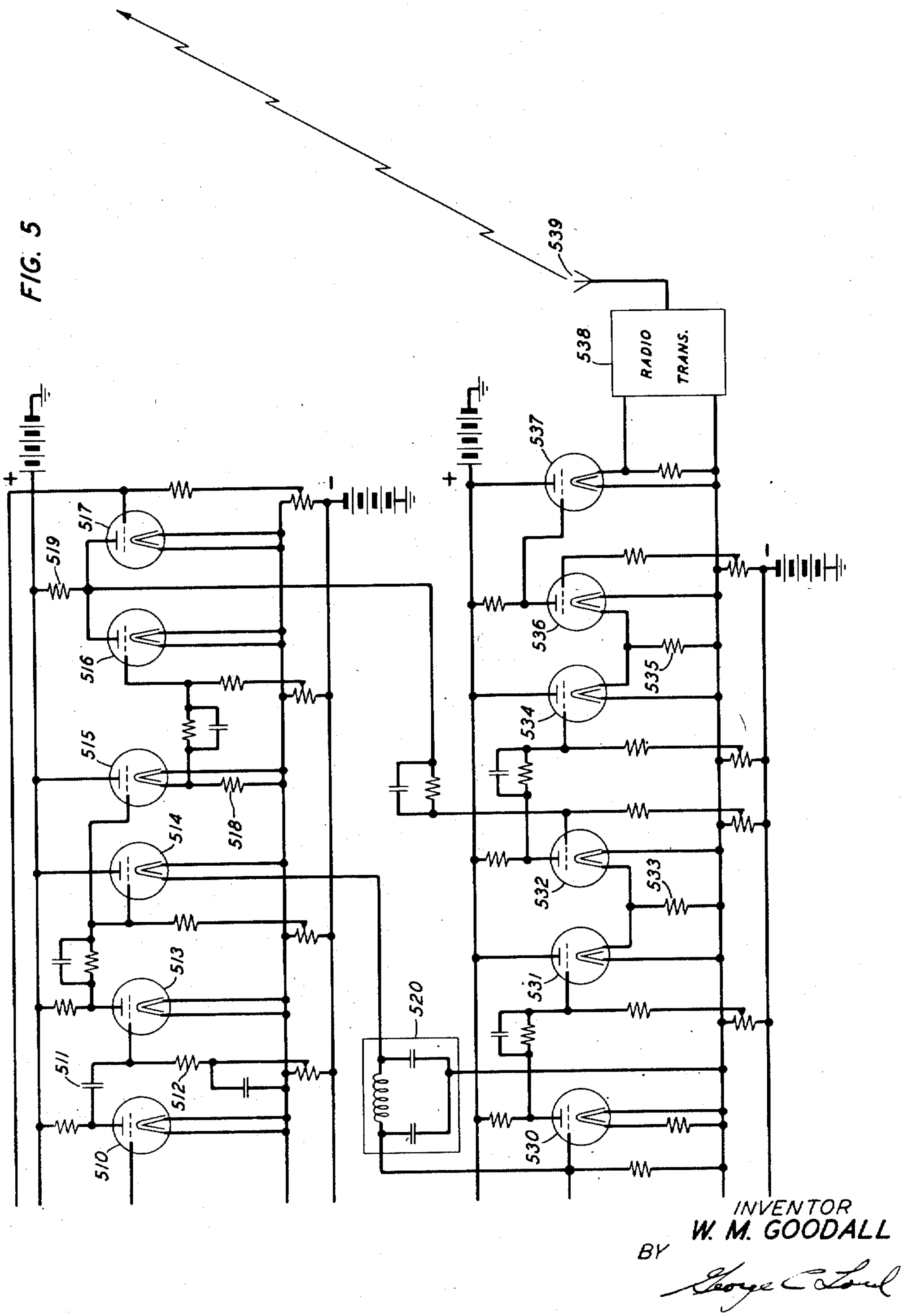

Figs. 3, 4 and 5 show in detail the transmitting circuits and equipment.

Figure 6:
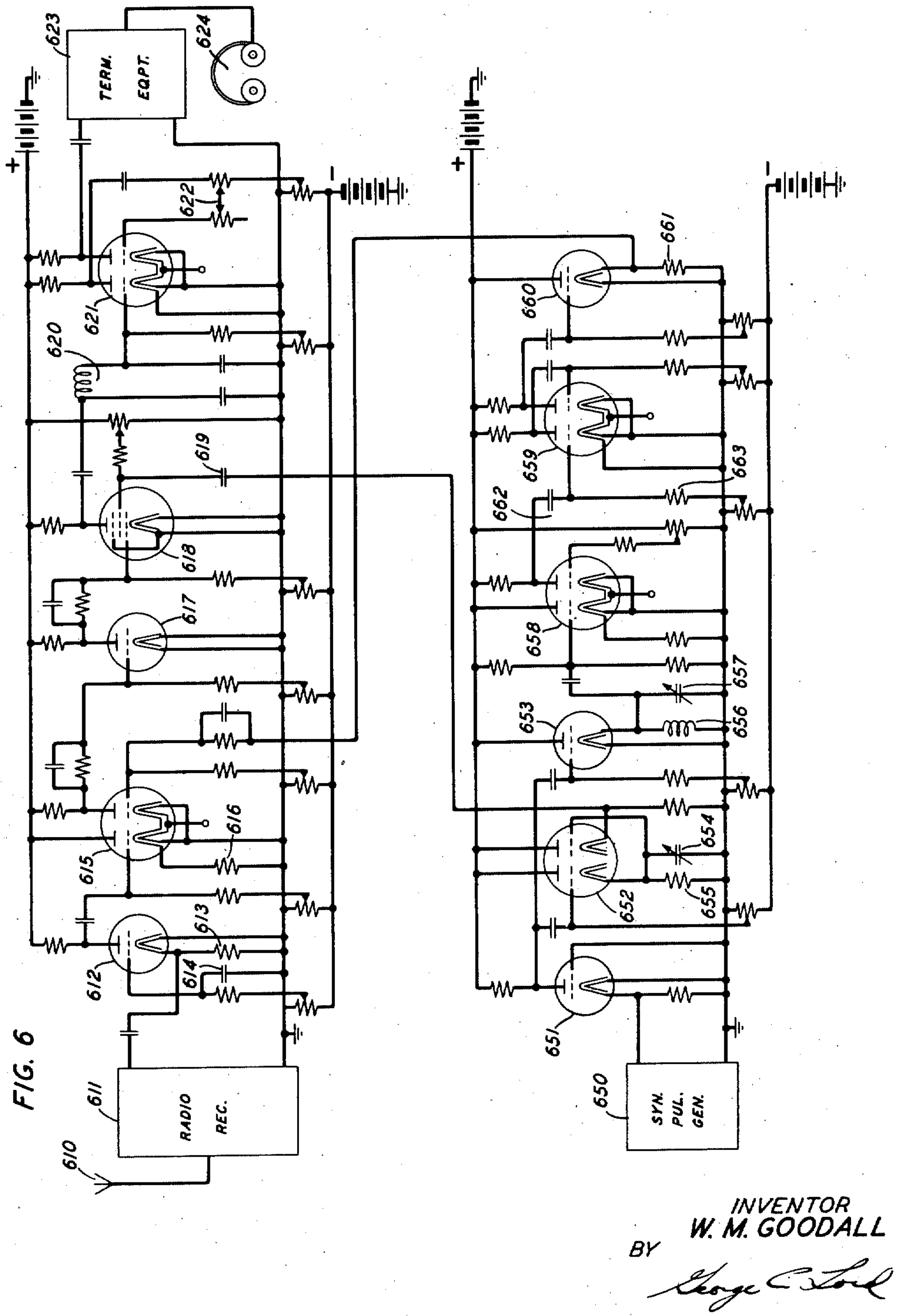
Figure 8:
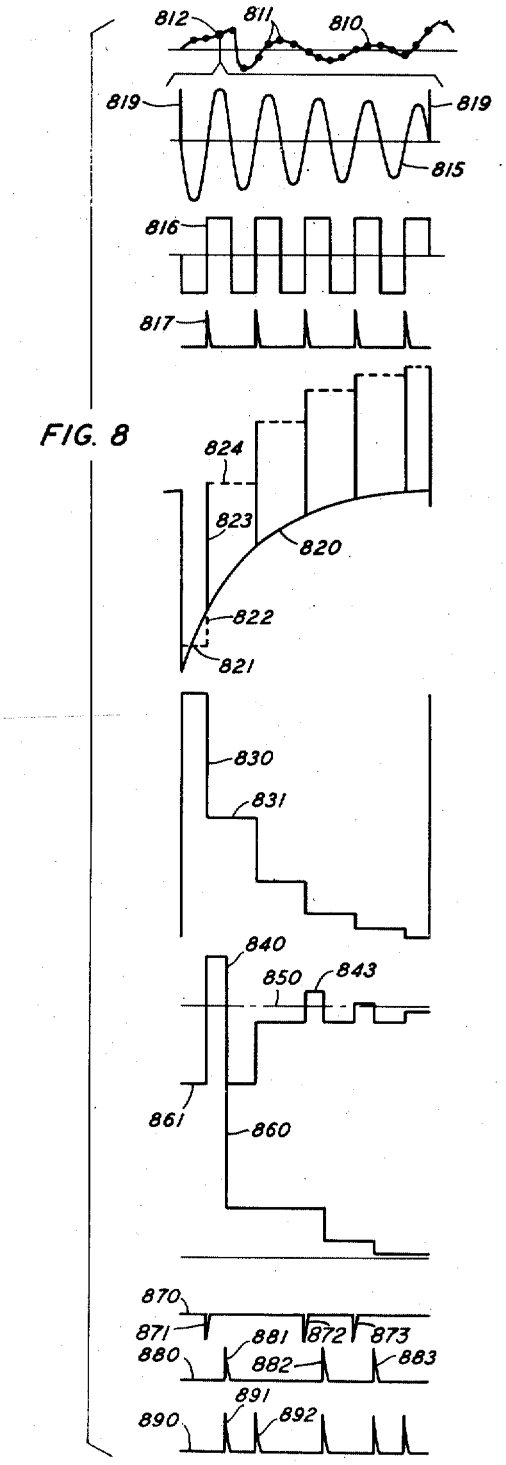
Figure 9:
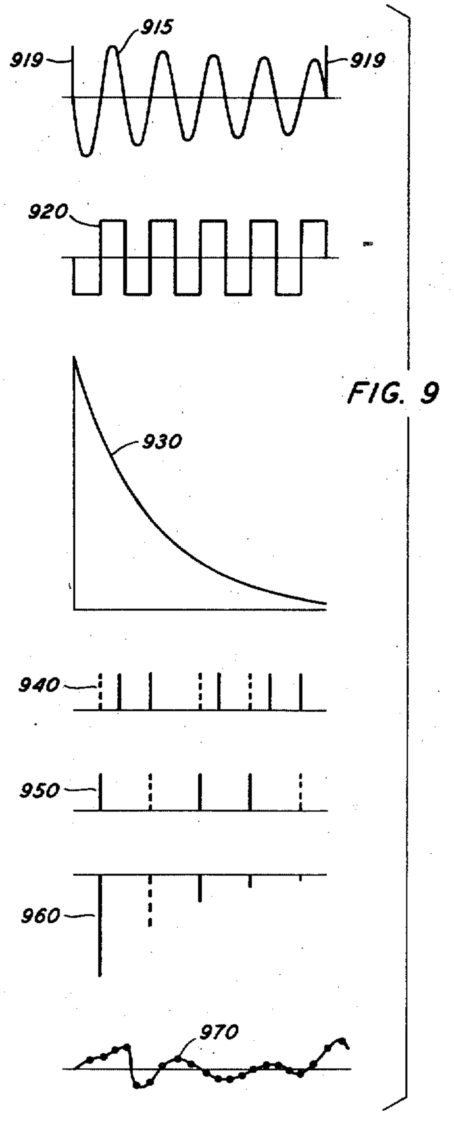

Fig. 6 shows the circuits and equipment at the receiving station which cooperate with the equipment at the transmitting station and reconstruct the complex wave from the pulses transmitted from the transmitting station;

Fig. 7 shows the manner in which the other figures are positioned adjacent one another; and Figs. 8 and 9 show the wave form of the currents of voltages at various places in the system in order that the mode of operation may be more readily understood.

The microphone 10 of Fig. 1 represents a source of signals to be transmitted. The microphone 10 is intended to represent a source of any complex wave including a source of telegraph signals, picture signals, vibration signals, as well as a source of speech and music signals.

*General description*

The output of the source 10 is connected through terminal equipment 11 to the pulse modulator 16. The terminal equipment 11 includes any and all suitable types of transmission interconnecting and switching equipment necessary or desirable to extend a communication path from source 11 to modulator 16. The terminal equipment 11 may include communication transmission circuits including cable conductors, open wire lines, channels of low or voice frequency carrier current, channels of high frequency carrier current, radio channels, toll line circuits, etc. The terminal equipment 11 may also include manual switching equipment as well as machine or dial switching equipment. This equipment may include suitable amplifiers, amplitude and phase control equipment and regulators such as gain regulators, etc. The terminal equipment 11 may include any combinations of the above types of equipment. In addition, the terminal equipment 11 will usually include a filter, limiting the frequency range of the components of the complex wave applied to the modulator equipment 16. In addition, the terminal equipment 11 may include other types of transmission apparatus such as volume-expanding or volume-compressing apparatus and other volume regulating apparatus.

In addition, synchronizing and common equipment, such as generator 12, is employed for generating synchronizing pulses. This equipment may be similar to a synchronous pulse-generating equipment disclosed in my copending application, Serial No. 554,495, filed September 16, 1944, Patent 2,449,467 of September 14, 1948, the disclosure of which is hereby made a part of the present application as if fully included herein. The output from the synchronous pulse generator is applied to monitoring equipment 25 and also to delay apparatus 13 which causes the pulse to be delayed a small fraction of a pulse interval, as will be described hereinafter. The delayed synchronizing pulses are employed to control the timing pulse generator 14, the exponential step generator 15, comparator 21, and the pulse modulator 16.

Under control of the delayed synchronizing pulse, the pulse modulator 16 causes an incoming complex wave to be sampled and a charge stored on a condenser which is a function of the magnitude of the instantaneous amplitude of the complex wave at the time of the delayed synchronizing pulse.

The exponential step generator 15 is employed to generate the exponential step wave form, that is, a step wave form in which the steps are exponentially related one with another. Specifically, wave generator 15 generates an exponential wave for each of the synchronizing pulses applied to it from the delay device or network 13.

The output of the delay device 13 is also applied to a timing pulse generator 14 which generates a plurality of short pulses for each delayed synchronizing pulse applied to it. The number of timing pulses generated by the timing pulse generator 14 in response to each synchronizing pulse is determined by the number of pulse intervals assigned to each code combination. The timing pulse generator generates a pulse for each pulse interval of each code combination of pulses.

The output of the timing pulse generator 14 is employed to control the exponential step generator so that this generator will generate a step for each of the timing pulses applied to it and thus generate a step for each of the pulse intervals of the transmitted signals. Mixer 17 is employed to add together the voltage across the storage condenser and the output of the exponential step generator 15 and to measure the resultant sum voltage. When the combined exponential wave form and voltage across the sampling condenser exceeds a predetermined reference value, an output pulse is produced in the mixer and applied to the amplitude gate 18. The output of the gate 18 is transmitted through a differentiating amplifier 19 to a second delay device or delay line 20 which delays the pulse about half a pulse interval. The delayed output pulse from the delay device 20 is then transmitted back to the mixer 17, where it causes the charge on the storage condenser to be reduced by the amount represented by the generated pulse, as described above.

The output of the delay device 20 is also applied to monitoring device 25, which reconstructs the complex wave and transmits it to a corresponding monitoring receiver 26, so that the attendants may keep informed relative to the operation and adjustment of this system. The output of the differentiating amplifier 19 comprises code groups of permutatively coded pulses each of either of two different signaling conditions or types, one type of which is the spacing pulse and the other the marking pulse. In the exemplary embodiment described herein the marking pulses from the differentiating amplifier 19 comprise pulses of current of fixed magnitude and duration. The spacing pulses are no-current pulses.

These pulses are transmitted to a comparator 21, which also receives pulses from the timing pulse generator 14. The comparator is so arranged that if a pulse of current is obtained from the differentiating amplifier at the same time that a timing pulse is obtained from the timing pulse generator 14, these pulses are canceled so that a current pulse will not be transmitted through the mixer 22 to the radio system 23. Under these circumstances, the delayed pulse from the delay device 20 will be transmitted through the mixer and output amplifier 22 to the radio system 23 and then from the antenna 24 to the distant station. If, on the other hand, a pulse is received from the timing pulse generator and a pulse of no-current is received from the differentiating amplifier 19, the pulse from the timing pulse generator is transmitted through the mixing and output amplifier 22 and over the radio system 23 and antenna 24. Under these circumstances, no pulse will be transmitted through the delay device 20.

It is thus quite apparent that the spacing condition, i. e. an off pulse from amplifier 19 is translated into and represented by a pulse from the timing pulse generator, while a marking condition, i. e. an on pulse from amplifier 19 is represented by a pulse delayed substantially half a pulse interval. Thus, the first series of permutatively-coded pulses of current and no-current are translated into pulses which are all substantially the same type, as far as concerns magnitude and duration but which have different times of transmission within the time interval assigned to the respective pulses of each code group.

The radio signals transmitted from antenna 24 are received by antenna 50 and conveyed to the radio receiver 51. Radio receiver 51 changes pulses or spurts of radio frequency into lower frequency pulses sometimes called video pulses. In other words, it changes the radio pulses to pulses similar to the pulses from the amplifier 22 at the transmitter.

It is, of course, to be understood that any suitable type of transmission medium may be employed for conveying pulses from the mixer output amplifier 22 to the receiving amplifier 52. This transmission path may include coaxial lines, wave guides, radio channels or channels of communication in any other suitable type of medium capable of transmitting the desired frequency band. Inasmuch as the communication paths are well known and operate in their usual manner the combination of the other elements of the exemplary embodiment of the antenna described herein in detail, the operation of this communication path and related equipment will not be described in greater detail herein. For more detail operation of suitable types of transmission paths reference is made to United States Patents 2,343,568 granted to L. W. Morrison on March 7, 1944; 2,212,240 granted to Lalande et al. on August 20, 1940; 2,095,360 granted to Green on October 12, 1937; and 2,206,923 granted to Southworth July 9, 1940, and to The Proceedings of the Institute of Radio Engineers for November 1934 which published a series of papers entitled "An Experimental Television System"; and an article entitled "High Grain Amplifier for 150 Megacycles" by Rodwin and Klenk also published in the Proceedings of the Institute of Radio Engineers for June 1940. The disclosures of the above patents and publications are hereby made a part of this application as if fully included herein.

The receiving equipment shown in Fig. 2 includes a synchronous pulse generator 53. This generator is similar to the synchronous pulse generator 12 at the transmitting station and is synchronized with the generator 12 at the transmitting station in any desired manner. This generator may be of the form synchronized in the manner disclosed in my Patent 2,449,467.

Any other suitable synchronizing arrangement and equipment may also be employed. Synchronizing may be accomplished over a separate channel as described in my above-identified patent or the signals received over the radio channel which convey the signaling pulses may be employed.

The synchronous pulse generator controls a timing wave generator 54 at the receiver which operates similar to the timing pulse generator 14 at the transmitting station. The synchronous pulse generator 53 also controls an exponential wave generator 55 which generates an exponential wave for each of the pulse groups received from the synchronous pulse generator.

The synchronous pulse generator 53, the timing wave generator 54 and the exponential wave generator 55 may be common to a plurality of receiving channels if desired just as the corresponding equipment at the transmitting station shown in Fig. 1 may be common to a plurality of transmitting channels. Such equipment, of course, may also be duplicated for each of the channels when desired.

The output of the radio receiver 51 is amplified by the amplifier 52. The resulting output pulses together with pulses from the timing wave generator are applied to the blanking modulator 56. The modulator equipment 56 combines these pulses to form pulse code groups of pulses similar to those generated by the differentiating amplifier 19 at the transmitting station. These pulses are then properly weighted and combined in the amplifier 57 and impulse receiver 58 and filter 59 so that the speech or other complex wave form is reconstructed.

The reconstructed wave form is then amplified by audio amplifier 60 and transmitted through the terminal 61 to a suitable receiving device 62. Terminal equipment 61 may include any or all of the equipment discussed above with reference to terminal equipment 11. The terminal equipment 61, of course, may be the same or different from the terminal equipment 11 depending upon the locations of the transmitting source 10 and receiving device 62.

Receiving device 62 is shown as a telephone receiver. It is to be understood, however, that receiving device 62 will be a device capable of properly responding to the type of signals generated by the source 10.

*Common equipment*

A synchronizing pulse generator is represented in Fig. 4 by rectangle 420. This synchronizing pulse generator may be of any suitable type, such as, for example, the type disclosed in my above-identified copending application. The output of the synchronous pulse generator 420 is transmitted through a delay line 421 in Fig. 4 which delays the synchronizing pulse a small fraction of a signaling pulse interval as will be pointed out hereinafter. The delay device, or line 421, may comprise any suitable apparatus such as disclosed in United States Patent 1,770,422 granted July 15, 1930, to Nyquist, as described in my above-identified copending application. The output of the delay line 421 is connected to the cathode circuit of the grounded grid amplifier tube 422. The output synchronizing pulses of the synchronizing pulse generator 420 as transmitted through the delay device 421 are positive pulses of short duration. These pulses are amplified by tube 422 which causes corresponding amplified positive pulses to be repeated in its output circuit. The wave shape of these pulses may be controlled in any desired manner and in general it is desirable that they be of short duration and of relatively large amplitude.

The delayed and amplified synchronizing pulses are applied to control the timing pulse generator shown in the upper portion of Fig. 3. The upper portion of Fig. 3 is employed as the timing wave generator and is employed to generate a group of timing pulses for each of the synchronizing pulses applied to it from the delay line 421 and tube 422. The timing pulse generator shown in the upper portion of Fig. 3 generates a timing pulse for each of the pulse intervals of each code group of pulses. In addition, it is desirable that these pulses be accurately timed one relative to another and in the usual case that they be equally spaced in time and comprise one timing pulse for each pulse interval of each code group.

The synchronizing pulse as applied to the grid of tube 310 is a positive pulse of short duration and large amplitude as pointed out above. Tube 310 is normally biased so that it will be non-conducting except upon the application of this synchronizing pulse. Upon the application of the positive synchronizing pulse to the control grid of tube 310, condenser 311 will receive a positive charge on its upper terminal and after the termination of the synchronizing pulse this condenser will start to discharge through inductance 312. Condenser 311 and inductance 312 then continue to oscillate at their natural frequency having produced in them an exponentially decaying or damped oscillatory wave. The decrement of the circuit is made relatively low so that the oscillating current will continue to flow in inductance 312 and condenser 311 for a number of cycles. The period or time duration of each cycle is controlled by adjusting the constants of condenser 311 and inductance 312 to be substantially equal to the time interval assigned to each of the pulses of a code group.

The upper terminal of condenser 311 is coupled through the coupling condenser 313 to the control grid of tube 314. Tubes 314 and 315 comprise a pair of tubes employed as limiting or clipping tubes which serve to produce a square wave in the output circuit of tube 315 in response to the damped oscillating wave generated in the resonant circuit comprising condenser 311 and inductance 312.

Tubes 314 and 315 may, for example, have biases applied to them such that, without the application of any potential through condenser 313 to the control grid of 314, both of these tubes conduct substantially the same amount of current. As a result their cathodes will be at an appreciable positive potential, due to current flowing through the common cathode resistor 316. Upon the application of a positive half cycle to the control grid of tube 314, this tube will conduct more current which causes the potential across the cathode resistor to rise and in turn causes tube 315 to conduct less current. As a result, the potential of the control grid of tube 314 does not have to rise far before tube 315 is cut off allowing its plate to rise to the maximum positive potential. Thereafter, an increase of the potential of the control grid of tube 314 will produce no further increase in the potential of the anode of tube 315. At the end of the positive half cycle of the oscillating current from circuit 311—312, the control grid of tube 314 will again be made negative becoming more negative than its bias potential as oscillations go into the negative half cycle. This change causes tube 314 to conduct less than normal current and thus to decrease the potential drop across resistor 316. This decrease in potential across resistor 316 causes an increase in the current in tube 315 compensating for the tendency of the potential across the resistor 316 to decrease and consequently limiting the self-regulatory action of tube 314. As a result only a small negative voltage on the grid of tube 314 will cut-off that tube and cause the anode of tube 315 to reach its maximum negative value. Any larger negative voltage on the grid of tube 314 will not effect the output voltage of tube 315.

Thus it is apparent that both top and bottom portions of the damped oscillating potential generated in the resonant circuit comprising condenser 311 and inductance 312 are not repeated. Instead a substantially square wave is generated in the output circuit of tube 315.

It should also be noted that the output resistor of tube 314 is connected in its cathode circuit so that so far as tube 314 is concerned it operates substantially like a cathode follower circuit and, consequently, has a relatively high input or grid impedance so that the operation of this tube does not interfere with or materially alter the damped oscillations in the oscillatory circuit comprising condenser 311 and inductance 312.

The output of tube 315 is coupled through a pair of pulse-shaping tubes 318 and 322 which serve, in effect, to take the derivative of the square wave and suppress the negative portions thereof and at the same time produce the desirable wave shape for the positive portion of the derived wave. In other words, they produce a very short positive pulse each time the square wave flowing in the output circuit of tube 315 changes from a lower to a higher positive value. The time constants of condenser 317 and resistance 319 which couple the output of tube 315 to the control element of tube 318 are such that the square wave generated in the output circuit of tube 315 is effectively differentiated. The bias of tube 318 is such that the negative portion of this differentiated square wave is suppressed while the positive portion is repeated. The succeeding coupling networks comprising condenser 320 and resistance 321 as well as condenser 323 and resistor 324 may be similarly designed to further shortening the pulses or improve their wave form or both. The output of tube 322 is applied to the control grids of two output tubes 325 and 326 which operate as cathode followers and are employed to repeat positive pulses of short duration and appreciable amplitude to utilization circuits which will be described hereinafter.

The operation of the code element timing circuit shown in the upper portion of Fig. 3 may be further explained by reference to graphs 815, 816 and 817 of Fig. 8. In Fig. 8 the lines 819 represent the delayed synchronizing pulses from the synchronizing pulse generator which are applied to the control grid of tube 310. Graph 815 represents the potential of the upper terminal of condenser 311 due to the oscillating current flowing in the resonant circuit comprising condenser 311 and inductance 312. The graph 816 represents the square wave output from tubes 314 and 315. Graph 817 represents the sharp positive pulses generated in the output circuits of tubes 325 and 326 which occur when the square wave changes in a positive direction, that is, from a low positive value or a negative value to a higher positive value. The pulses which occur when the square wave 816 changes in the reverse direction have not been shown because they are suppressed as described above.

*Exponential step wave generator*

The lower portion of Fig. 3 discloses apparatus and circuit details of an arrangement for generating step wave forms having steps which are exponentially related one to another. The circuit shown in the lower portion of Fig. 3 is arranged to generate such a step wave form in response to each of the delayed synchronizing pulses from a synchronizing pulse generator 420 after it is transmitted through the delay device or network 421 and tube 422.

Tube 356 is normally biased so that it conducts no current except during the application of a positive pulse from the synchronizing pulse generator to its control element. During the application of such a positive pulse to the control element of tube 356, condenser 355 connected in the cathode circuit of tube 354 is discharged. That is, the upper terminal of this condenser has its potential reduced to a relatively low value near ground potential. The positive synchronizing pulse is also applied to the control grid of tube 350 which in turn causes condenser 351 to be likewise discharged, that is, the potential of the upper terminal of this condenser is reduced to a low value near ground potential.

Thereafter upon the termination of the positive synchronizing pulse both tubes 350 and 356 cease to conduct current. Condenser 351 thereupon starts to charge and its upper terminal becomes more positive. The charging circuit comprises a high resistor 361 which controls the rate of charging of condenser 351. As is well understood by persons skilled in the art the charging of condenser 351 is in accordance with the exponential wave form. The upper terminal of condenser 351 is coupled to the control grid of tube 354. This tube, however, has a bias applied to its control grid such that this tube passes no current at this time. Consequently, the upper terminal of 355 does not change its potential. Curve 820 shows the potential of the upper terminal of condenser 351. The dotted curve 821 shows the potential of the upper terminal of condenser 355. The portion 821 remains constant as is described above until a positive timing pulse from the cathode circuit of tube 325 is applied to the control grid of tube 352. Tube 352 is normally non-conducting except during the time the positive pulses from the code element timing circuit are applied to its control grid. During the application of a positive pulse to the control grid of tube 352, a high current flows in its anode-cathode circuit and produces a relatively high voltage drop across resistor 353 connected in series with the condenser 351. This high potential is added to the potential across condenser 351. Inasmuch as resistor 361 has a high resistance it does not materially interfere with or prevent the upper terminal of condenser 351 from rising to a voltage which is substantially the sum of the voltage across condenser 351 and the voltage across resistor 353. The magnitude of the sum of these voltages is sufficient to cause the flow of current in the anode circuit of tube 354 which causes the upper terminal of condenser 355 connected in the cathode circuit of tube 354 to rise to substantially the sum of the voltages across resistor 353 and condenser 351. Upon the termination of the code element timing pulse applied to the control grid of tube 352, this tube ceases to conduct current so that the upper terminal of condenser 351 returns to its previous potential and tube 354 ceases to conduct current. Thereafter, the potential of the upper terminal of condenser 355 remains constant at its new value illustrated by the dotted line 824, while the upper terminal of condenser 351 will resume charging along the exponential curve 820. It should be noted that the code element timing pulses applied to the control grid of tube 352 are of sufficiently short duration that they do not materially change the charging rate of condenser 351. While it is true that this condenser will not charge at the same rate, if at all, during the applications of these positive pulses to the control grid of tube 352, the time duration of these pulses is such that the charges of condenser 351 are exponentially related at the times the succeeding code element timing pulses are applied to the control grid of tube 352. As a result, upon the application of successive code element timing pulses the condenser 355 is charged to successively higher potentials, which are exponentially related to the previous values. Thus a step wave form is generated across condenser 355. This step wave form is repeated in both the anode and cathode circuits of tube 357 and employed to control the coding circuits as will be described hereinafter. It should be noted that the step wave form in the cathode circuit of tube 357 and thus the cathode circuit of tube 358 is exponentially increasing in the manner described above for the upper terminal of condenser 355, while the wave form in the anode circuit of tube 357 is exponentially decreasing as shown in graph 830.

It is thus apparent that each of the code element timing pulses causes the potential of the upper terminal of condenser 355 to be abruptly increased and that the application of a synchronizing pulse causes the potential across condenser 355 to be returned to a relatively low value. Consequently, the step wave form is generated in response to the synchronizing pulses transmitted to the delay device or line 421 and has a step for each of the code element timing pulses generated by the code element timing circuit shown in the upper portion of Fig. 3.

The manner in which the code element timing pulses and the step wave are employed in the exemplary system described herein will be described in detail hereinafter.

*Sampling*

The speech currents or other complex waves from microphone or other source 410 are transmitted through the terminal equipment 411 to the control grid of tube 430 of the pulse modulator circuit, causing the potential of control grid of tube 430 to follow the speech or other complex wave form. Tube 430, however, is biased by the negative voltage applied to the suppressor grid so that it will not normally conduct current. The suppressor grid is supplied with pulses from the synchronizing pulse generator 420 after these pulses have been transmtted through the delay device or line 421. During the application of the positive pulses from these devices after they have been amplified by tube 422 as described above, tube 430 will pass current of a value controlled by the potential of the control grid and thus of a value which is a function of the amplitude of the speech or other complex wave at the time each of the synchronizing pulses is applied to the suppressor grid.

The output or anode of tube 430 is coupled through the coupling transformer 431 to the control grid of tube 432 of the mixer. Tube 432 is biased so that it does not pass any current in its anode-cathode circuit unless it receives a positive pulse through the transformer 431 from tube 430. As pointed out above, the magnitude of each of these pulses through transformer 431 is a function of the magnitude of the speech wave at the time of each of the delayed synchronizing pulses. As pointed out above in the description of the step wave generator, the output of tube 358 is caused to return to its lowest step in response to each of the synchronizing pulses. Consequently, the current from the cathode of tube 358 flowing through resistor 434 in the cathode circuit of tubes 432 and 358 will be reduced to a minimum. Condenser 433 will receive a charge such that the potential across this condenser is a function of the magnitude of the pulse received through transformer 431 and thus a function of the amplitude of the speech wave at the time of the respective synchronizing pulses applied to the suppressor grid of tube 430.

It will, of course, be understood by persons skilled in the art that other grids of tubes 430 may be employed for applying the various pulses thereto and still have the tube operate equally satisfactorily to cause the incoming speech or other complex wave to be sampled and a corresponding charge or potential stored upon condenser 433.

The above-described sampling and storing may be more readily understood from Fig. 8, in which graph 810 represents a typical incoming speech or other complex wave form. The instants of time represented by dots 811 show typical times at which this wave form is sampled and the time designated 812 has been selected as the time at which the sample is obtained, for the purpose of illustrating the operation of the system. The time between this sample and the next one has been expanded between lines 819 representing two synchronizing pulses, in order that the operation of the various circuits may be more readily understood. Also, the graph 860 represents the potential at the upper terminal of condenser 433, section 861 representing the potential of the upper terminal of this condenser immediately after the synchronizing pulse in question has been received. This potential thus is a function of the amplitude of the complex wave at the time the particular synchronizing pulse is received from the synchronizing pulse generator 420.

*Coding*

As illustrated by the portion 861 of graph 860, the potential of the upper terminal of condenser 433 then remains constant until the step wave form advances to the next step illustrated by line 824 of Fig. 8. During the time the step wave form is advancing in the manner described above, in response to the first of the code element timing pulses, both terminals of condenser 433 are caused to have their potential increase in a positive direction abruptly and in turn cause the potential of the control grid of tube 437 to also rise in a positive direction to a higher value. It should be noted that the potential of the step wave form appearing across resistor 434 is added to the potential or upper terminal of condenser 433 so that the sum of these potentials, as thus combined, is applied to the control grid of tube 437.

Tubes 437 and 438 operate in a manner somewhat similar to tubes 314 and 315 described above in that they cause a limiting or clipping action to take place in the same manner as described above. These tubes, however, are biased slightly differently because the grid of tube 438 is returned to a potential which is sufficiently positive that this tube normally conducts sufficient current to cause its cathode and the cathode of tube 437 to be appreciably above the control grid of tube 437. Thus tube 437 is biased to cut-off, that is, so that substantially no current flows in its anode-cathode circuit.

If the grid potential of tube 437 rises above a predetermined value, such as illustrated by the dashed line 850 of Fig. 8, current will flow in the anode-cathode path of this tube and further increase the potential drop across the common cathode resistor 439, which in turn causes the current flowing through tube 438 to be substantially cut off, thus causing the output of this tube to rise to a high positive value.

This change in potential is repeated through tubes 440, 441, 442, and 510 so that the output of tube 510 rises if the potential of the grid of tube 437 rises appreciably above the potential represented by line 850, Fig. 8, and the amount of the rise is substantially constant and independent of how much the potential of the control element of tube 437 rises above the potential represented by line 850. Conversely, so long as the potential of the control grid of tube 437 remains less than the potential represented by line 850, substantially the same low potential is maintained on the anode or output circuit of tube 510, independently of how much less than the potential represented by line 850 the grid of tube 437 becomes.

The output of tube 510 is coupled by means of a coupling network comprising a condenser 511 and a resistor 512 to the grid of tube 513 of the differentiating amplifier. The time constants of the condenser 511 and the resistor 512 are such that they cause a potential to be applied to the grid of tube 513 only during changes in potential of the anode of tube 510. In other words, they serve to differentiate any changes in potential of the anode of tube 510. Tube 513 is biased so that the change in anode potential of tube 510 from a high positive value to a relatively low positive value is suppressed, whereas changes in potential from a relatively low positive value to a higher value are amplified and repeated by tube 513. The output of tube 513 is coupled to the control grids of tubes 514 and 515, which operate as cathode followers and repeat the differentiated positive pulses. Tube 513, in repeating the differentiated positive pulses, changes these pulses into negative pulses and tubes 514 and 515 repeat these pulses as negative pulses. Thus a negative pulse from the cathode of tube 514 is transmitted through the delay line or device 520 and applied to the control grids of tubes 530 and 443. Any suitable type of delay device or line may be employed for the device represented as a delay network 520 in Fig. 5, such as mentioned above with respect to the delay device or line 421.

Delay device 520 is designed to have a delay interval of an appreciable fraction of a pulse interval, as, for example, a quarter, third, half, etc., of a pulse interval. As shown in the drawings, the delay interval is assumed to be approximately three-eighths of a pulse interval in length. The maximum length of this delay interval will depend upon numerous adjustments and factors of the circuit which may be readily controlled, as is well understood by persons skilled in the art.

Tube 443 serves to amplify and repeat the negative pulses applied to its control grid as positive pulses in its output circuit. These pulses are applied to the control grid of tube 435.

Tube 435 is normally biased so that it does not conduct current except during the time positive pulses are applied to its control grid from tube 443 as described above. Tube 435 has in addition applied to its screen an inverted step wave form, that is, a step wave form as shown by graph 830 of Fig. 8 which is derived from the anode of tube 357 as described above. Thus, the amount of current passed by tube 435 upon the application of the various pulses to its control grid will be controlled by the potential of the screen of tube 435 and thus by the step wave form shown by graph 830 of Fig. 8.

Returning now to the sample stored on condenser 433 as described above and shown by line 861 of Fig. 8, it will be noted that upon the application of the first timing pulse to the step wave form and in response to the leading edge of the first step of the wave form, the potential of the grid of tube 437 as illustrated by graph 840 rises above the bias or reference potential represented by line 850 of Fig. 8. As a result, a negative pulse 871 is transmitted through the delay device 520 as described above. After the delay interval of time determined by the delay device the positive pulse 881 is applied to the control grid of tube 435. At this time the potential of the screen of this tube has a magnitude represented by the first step 831 of the inverted step wave form described above, which is of such a value that sufficient current flows through the anode-cathode circuit of tube 435 to discharge condenser 433 by an amount equal to half of the total maximum charge that may be stored upon the condenser in response to the amplitude of the complex wave at the sampling instant of time. Thus, this pulse which is transmitted over the system, as will be described hereinafter, represents half of the total possible magnitude of the sample. If no pulse is transmitted due to the fact that the potential of tube 437 failed to rise above the reference potential, it would indicate that the sample was less than half its maximum amplitude. If, however, the sample is above half the total maximum possible amplitude, a pulse will be transmitted which pulse in turn is fed back into tube 435 and causes the charge on condenser 433 to be reduced by the same amount as represented by the pulse. When the potential of the upper terminal of condenser 433 is reduced the potential of the grid of tube 437 is likewise reduced and under the assumed conditions will be reduced below the reference potential represented by line 850. As a result the potential of the anode of tube 510 is again restored to this low potential value. This operation is clearly illustrated by graphs 840, 860, 870 and 880 of Fig. 8. Thereafter the potentials of the system remain substantially as described, until a second code element timing pulse is received from the code element timing circuit and causes the step generator to generate the second step of the step wave form. The leading edge of this step causes the potential of the control grid of tube 437 to again rise. However, under the assumed conditions it does not rise above the reference potential 850, as illustrated in Fig. 8, due to the magnitude assumed for the sampling. Consequently, no current pulse is transmitted through the delay device 520 at this time and as a result the charge on the upper terminal of condenser 433 is not changed.

At a later interval of time the third code element timing pulse is received from the code element timing circuit and causes the step wave form to be advanced to its third step. This step wave form as pointed out above is added to the charge or potential across condenser 433. Under the assumed conditions as illustrated by graph 840 the combined voltage across resistor 434 and condenser 433 exceeds the reference voltage 850. This is shown by a portion of graph designated 843 in Fig. 8. As a result the potential of the anode of tube 510 abruptly rises from a relatively low value to a relatively high value which causes a negative pulse 872 to flow in the output circuit of tube 513, which pulse is repeated by tube 514 and transmitted through the relay line or device 520. The delayed pulse after amplification is applied as a positive pulse 882 to the control grid of tube 435. The screen of tube 435 has a potential corresponding to the third step of the inverted step wave form applied to it at this time. Consequently, sufficient current will flow through tube 435 to remove the amount of charge represented by the pulse transmitted in the third pulse interval, namely one-eighth of the total maximum possible charge which may be applied to condenser 433 under control of the incoming speech or other complex wave form. The combined potential across resistor 434 and condenser 433 is therefore reduced below the reference potential represented by line 850, and as a result tube 437 ceases to conduct current and causes the potential of the anode of tube 510 to fall to a relatively low positive value. The resulting negative pulse is to be applied to the grid of tube 513. However, due to the bias supplied to the elements of tube 513 this negative pulse is suppressed. Thereafter, the circuits remain in the above-described condition until the fourth code element timing pulse is received. At this time the potential across resistor 434 due to the third step of the step wave is equal to one-sixteenth the total possible amplitude that may be applied to condenser 433. The addition of this potential to the potential across condenser 433 again causes the combined potential to exceed the reference bias potential represented by line 850 to cause another pulse 873 to be transmitted as described above for the pulses 871 and 872. The corresponding delayed pulse 883 will cause the charge on condenser 433 to again be reduced in the same manner as described above. However, at this time the charge will be reduced only by one-sixteenth of the total possible amount of charge of condenser 433. When the fifth code element timing pulse is generated the potential of the step wave form again produces a voltage across resistor 434. The voltage at this time however is insufficient to cause the combined potential across resistor 434 and condenser 433 to exceed the reference potential represented by line 850. As a result, the circuits remain in the condition shown until another sample is obtained and the above cycle of operation completed.

It is thus apparent that the output of tube 513 which is repeated by tubes 514 and 515 comprises a code group of pulses representing the magnitude of each of the samples. The pulses as repeated, in the output or cathode circuit of tube 515, are of either of two different signaling conditions, on or off, for each of the different pulse intervals of the code group. The pulses obtained at this place in the system are similar to the pulses obtained in my above-identified copending application and are transmitted to the distant station in the manner described in that application. The pulses obtained as described above are obtained in a somewhat different manner but represent the signals in the same manner. These pulses are capable of being transmitted to the distant station as described in my above-identified copending application. Also the coding arrangement described in my above-identified copending application can be substituted for the above-described coding arrangement in the system disclosed herein.

With the specific conditions assumed, for the above-detailed description, each sample is represented by a code combination of five pulses. It is to be understood, however, that the invention and system is not limited to a code of five pulses; any other suitable or desirable number of pulses may be employed to represent each sample.

*Translating to a time modulated code*

The output of the coder as so far described like that of my above-identified application, comprises for each signal sample a code group of on-off pulses. In such a system the two alternative signaling conditions—marking or spacing—are represented in each interval or time division channel assigned to the respective code elements by one of two pulsing conditions namely "on," the presence of a pulse or "off," the absence of a pulse. In the system of the present invention both the marking and spacing conditions are represented by the presence of a pulse but the two conditions are differentiated by the time or position within the code element intervals at which the pulse occurs. The circuit for converting the on-off pulse into the time modulated pulse will next be described.

In the exemplary embodiment of the invention described herein, code groups of pulses received from the cathode of tube 515, which as described above comprises a pulse of one or another of the two different signaling conditions, on or off, in each of five different pulse intervals occurring in succession are translated into a group of five pulses all on, each of which is assigned to respective intervals occurring in succession. However, the pulses may occupy any one of a plurality of positions within the interval. Thus, in the exemplary embodiment described herein where two signaling conditions are employed, the final pulses may occupy either one of two different time intervals or positions in the interval assigned to each of the pulses.

Alternatively, the system may be considered as sending two pulses in each pulse interval, one of the pulses of the type described above as received from the cathode of tubes 514 and 515, which pulses are transmitted during the second portion of each pulse interval and a second complementary or opposite group of pulses which are transmitted during the first portion of each of the intervals assigned to each of the pulses of the code group.

The translating equipment comprises tubes 516, 517, 530, 531 and 532. These tubes and related circuits operate to translate the pulses received from tube 515 into the time modulated pulses or to add to them their complementary pulses, depending upon the language employed to describe the improved system disclosed herein. Pulses from the cathode of tube 515 are applied to the control grid of tube 516. Positive code element timing pulses are applied to the control grid of tube 517. Pulses applied to the grids of tubes 516 and 517 should be applied substantially simultaneously. In order to accomplish this it may be necessary to slightly delay the positive code element timing pulses from the cathode of tube 326 so that they will arrive at the control grid of tube 517 at substantially the same time as the negative code groups of pulses described above arrive at the control grid of tube 516. The pulses described above as applied to the grid of tube 516 are negative, while those applied to the grid of tube 517 are positive. Consequently, if a negative pulse is applied to the grid of tube 516 at the same time a positive pulse is applied to the grid of tube 517 these pulses may be made to cancel in the combined output circuit of tubes 516 and 517 comprising resistor 519. If on the other hand, no negative pulse of a code group of pulses is applied to the grid of tube 516 at the time the positive code element timing pulse is applied to the grid of tube 517, the (positive) code element timing pulse is repeated as a negative pulse in the combined output circuit of tubes 516 and 517 and is applied to the control grid of tube 532.

Consider now the pulses generated in the manner described above in response to the assumed set of conditions which are illustrated by graph 870 in Fig. 8. When the first code element timing pulse is generated and applied to the control grid of tube 517 as described above, a negative pulse is also applied to the control grid of tube 516. The positive code element timing pulse applied to the grid of tube 517 and the negative code pulse applied to the grid of tube 516 are of substantially the same magnitude so that they cancel each other and cause substantially no change in the potential of the control grid of tube 532. Consequently, a pulse of no current, that is, no change of current, takes place in the output circuit of tube 532 at this time. However, as described above a negative curent pulse is transmitted through the delay device or line 520. This delayed pulse is applied to the control grid of tube 530 which amplifies and causes a positive pulse 881 to be applied to the control grid of tube 531. The tubes 531 and 532 will operate at this time to repeat a positive pulse of current in the output circuit of tube 532, the positive pulse on the grid of tube 531 causing an increase in the current of the common cathode resistor 533 and consequently a decrease in the current through tube 532. The output pulse from tube 532 is then limited and shaped by tubes 534 and 536, and then repeated through the output tube 537 to the radio equipment 538. Thus during the first pulse interval, that is, in response to the first code element timing pulse generated in the code element timing circuit a pulse of current 891, see Fig. 8, is generated in the code translating circuit. This pulse is in effect delayed in the translating circuit so that it is transmitted a substantial fraction of the pulse interval later. In other words, if the pulse generated by the coding circuit at this time under the assumed conditions is called a marking pulse which is a pulse of current, the marking pulse is transmitted as a delayed pulse, although still transmitted during the first pulse interval.

The second pulse from the coding circuit under the conditions assumed above will be a spacing pulse, that is, the pulse of the opposite signaling condition which in the exemplary system set forth herein is represented by a pulse of no current, and off pulse. Consequently, the grid of tube 516 is not made more negative at the time the second code element timing pulse is applied to the control grid of tube 517. As a result a negative pulse is applied to the control grid of tube 532 at this time and this causes a positive pulse 892 to flow in its output circuit and to be relayed to the radio transmitter 538 and to be transmitted from antenna 539. This pulse 892 is transmitted at substantially the same time as the code element timing pulse is generated. In other words, the pulse is not materially delayed. Thus an undelayed pulse is equivalent to a spacing pulse while a pulse delayed an appreciable fraction of the pulse interval assigned to the pulse is a marking pulse. In a similar manner the other pulses are transmitted over the radio system.

It should be noted that if one considers two pulses transmitted during each of the pulse intervals, the second or delayed pulse has the same signaling condition as the pulse from the coding circuit, whereas the undelayed pulses have the opposite signaling condition. Thus during the interval assigned to each code element pulse a pulse of each character is transmitted. Inasmuch as they are transmitted over the radio system the pulses of one character are represented by high frequency radio current which causes the tubes generating them to heat up and change their frequency slightly. The fact that a pulse of this character is transmitted during each code interval tends to impose the same duty cycle upon the radio transmitter or at least greatly reduce variations in the duty cycle, which in turn reduces variations in the radio frequency actually transmitted by the radio system. In addition, in such an arrangement the energy transmitted during each code combination is substantially constant. Consequently the code combinations are less intelligible in an ordinary radio receiver which does not properly decode pulses. Furthermore, since substantially the same energy is transmitted during each pulse interval and thus during each code group, the average current, voltage and energy of each code group are the same so that the code groups are all distorted substantially the same when transmitted through the usual transmission circuits and devices so that this distortion may be much more readily compensated for than in former systems where the above quantities varied appreciably from code group to code group.

*Transmission*

The coded time-modulated pulses from tube 532 are shaped and amplified by tubes 534, 536 and 537 and then transmitted to the radio transmitter 538. These pulses are employed to modulate a high frequency radio transmitter in such a manner that they cause spurts of high frequency radio current to be transmitted from antenna 539 in response to the application of the respective pulses to the radio transmitter 538.

While the drawing of the exemplary embodiment of this invention described herein in detail shows a radio system for conveying the pulses from one terminal to another it is to be understood that any other suitable transmission paths or media may be employed to convey the pulses between the terminals. In general, this transmission path may include communication lines, cables including coaxial cables, wave guides, and radio systems operating in any desired frequency range including the ultra-high frequency or microwave frequency range wherein the radio waves may be sharply directed and possess quasi-optical properties. One of the features of the systems of the type described herein is that the transmission medium including the transmitting and receiving equipment may be non-linear and thus produce large distortions of both the amplitude and shape of the pulses, and may actually be very noisy without these deficiencies of the transmission medium and path materially altering or interfering with the quality of the transmission so long as presence or absence of pulses of current, that is spurts of high frequency electromagnetic wave energy may be accurately recognized. All that is necessary is that these waves be sufficiently strong to permit their presence or absence to be accurately recognized and determined at the receiving station. If the transmission path or medium is sufficiently good to permit such accurate determination of the pulses the distortions of the transmission medium together with the noise encountered therein may be substantially all eliminated at the receiving terminal.

*Receiving terminal*

Fig. 6 shows a receiving terminal wherein the high frequency waves are received by antenna 610 and amplified and converted into pulses by the radio receiver 611. Positive pulses from the radio receiver 611 are amplified by the grounded grid amplifier tube 612.

In addition to the pulse receiving equipment at the receiving station as shown in Fig. 6, it is necessary to provide a source of synchronizing pulses, as for example a synchronous pulse generator 650, together with an exponential wave generator and the code element timing pulse generator.

The synchronous pulse generator represented in Fig. 6 at 650 may comprise any suitable type of synchronous pulse generator capable of generating a pulse for each received code combination. This synchronous pulse generator may be synchronized from the signals or it may be synchronized with the synchronous pulse generator at the transmitting station described above by means of a separate synchronizing channel as shown in my above-identified copending application which application forms a part of the present application as if fully included herein.

The output of the synchronous pulse generator 650 is applied to the cathode of the grounded grid amplifier tube 651, which amplifies the synchronous pulses and applies a positive pulse to the grid of each of the tubes 652 and 653 in response to each synchronous pulse generated by the synchronous pulse generator 650. When a positive pulse is applied to the control element of tube 652 current will flow in the anode cathode circuit of this tube and charge the upper terminal of condenser 654 to a relatively high positive potential. After the termination of the synchronous pulse which is of short duration, condenser 654 will start to discharge through resistor 655. The discharge of a condenser through a resistance follows the well-known exponential law in which the current and voltage vary exponentially with time as is well understood by persons skilled in the art. The upper terminal of condenser 654 is coupled through the right section of tube 652 acting as a cathode follower and condenser 619 to the screen of the decoding tube 618 the action of which as will be described hereinafter.

Lines 919 of Fig. 9 represent the pulses from the synchronous pulse generator as applied to the control elements of tubes 652 and 653. Graph 930 of Fig. 9 shows the wave form of the potential of the upper terminal condenser 654 which potential is applied to the screen of tube 618 through the coupling condenser 619.

The application of positive synchronizing pulses to the control element of tube 653 causes the upper terminal of condenser 657 to be charged to a positive potential during the application of each of the synchronizing pulses. At the termination of each of these pulses which pulses are of short duration, condenser 657 will start to discharge through inductance 656. As a result a damped oscillating current flows in the resonant circuit comprising inductance 656 and condenser 657. The wave form of this current is represented by graph 915 of Fig. 9. As in the case of the code element timing circuit at the transmitting station the code element timing circuit at the receiving station is arranged to produce one complete cycle of oscillation, during each time interval assigned to a pulse in each of the code groups of pulses to be transmitted. The upper terminal of condenser 657 is coupled to the control grid of the left-hand section of tube 658. Tube 658 operates as a limiting or clipping amplifier similar to tubes 314 and 315 as described above with the result that the output of the right-hand section of tube 658 is substantially a square wave form such as illustrated by graph 920 at Fig. 9.

The output of the right-hand section of tube 658 is coupled through a coupling network comprising condenser 662 and resistor 663 to the control element of the left-hand section of tube 659. Two sections of tube 659 are coupled together in tandem by means of similar coupling networks and the right-hand section of this tube in turn is coupled by a similar network to the control element of tube 660. Any or all of these coupling networks is designed to have a time constant such that they will in effect differentiate the square wave form applied thereto producing pulses of only very short duration. Due to the bias potential supplied to these tubes they are arranged to repeat only the pulses which occur when the square wave changes from a relatively low potential value to a relatively high potential value. As a result the output of tube 660 comprises pulses of short duration and substantially constant wave shape. In response to each of the synchronizing pulses applied to the control element of tube 653, a code element timing pulse flows in the output circuit of tube 660 for each pulse interval of each of the pulse code groups which are received and which represent the complex wave forms being transmitted over the system. These code element timing pulses occur in the first portion of each pulse interval during which portion undelayed pulses are transmitted.

The output of tube 660 is coupled to the control element of the right-hand section of tube 615, while the control element of the left-hand section of tube 615 is coupled to the output of the amplifier tube 612. Thus the control element of the right-hand section of tube 615 receives a positive pulse during the first portion of each of the pulse intervals of each code group being transmitted over the system, while the control element of the left-hand section of tube 615 receives a pulse in response to the received pulses which may be during either the first or second portion of the code element interval.

The pulses as applied to both of the control elements of tube 615 are positive. The positive pulse applied to the control element of the left-hand section of tube 615 tends to cause the current through this section to increase and the current through the right-hand section to decrease due to the resulting increased voltage drop across the common cathode resistor 616. The positive pulse applied to the control element of the right-hand section of tube 615 tends to cause the current through this section to increase. By a suitable choice of the values of the various circuit elements and the relative magnitudes of the two positive pulses applied to the control elements of both sections of tube 615, these pulses may be made to substantially cancel or neutralize each other in the output circuit of the right-hand section of tube 615.

Thus in accordance with the conditions assumed above at the transmitting station, the first pulse was marking and consequently transmitted over the system as a delayed pulse. As a result there will be no pulse on the grid of the left-hand section of tube 615 when a code element timing pulse is applied to the right-hand section of this tube from the code element timing generator. Consequently, the right-hand section of tube 615 will have a negative pulse repeated in its anode circuit due to the application of the code element timing pulse to its control element. This negative pulse is repeated and amplified and shaped by the repeater tube 617.

At a fraction of a pulse interval later, when the first pulse is received from the radio system and in turn applied to the control grid of the left-hand section of tube 615 no positive pulse will be received from the code element timing generator. Consequently, a positive pulse will be repeated to the output circuit of tube 615 through the coupling resistor 616 in the common cathode circuits of both sections of this tube. This pulse is then applied to the control element of tube 617 which tube repeats the pulse as a negative pulse in its output circuit.

Tube 618, however, is biased so that it will not repeat the negative pulse applied to its control element from the output of the tube 617.

Under the assumed conditions, the second pulse which is an undelayed pulse will be received from radio receiver 611 substantially simultaneously with the application of a pulse from the code element timing circuit and as described above will produce substantially no output pulse in the anode circuit of the right-hand section of tube 615. If these two pulses are not completely supressed by the two sections of tube 615, the circuits may be arranged so that any small residual pulse will be positive in the output circuit of the right-hand section of tube 615 and will therefore be suppressed by tube 618 as described above.

The next two pulses received from the radio receiver will be delayed pulses and consequently will not neutralize or cancel the pulses from the code element timing circuit. The delayed pulses from the radio receiver, however, will not be repeated by tube 618 as described above with reference to the first pulse. The fifth pulse will be received at the same time as the fifth code element timing pulse and consequently these two pulses tend to cancel or nullify each other.

It is thus apparent that a negative pulse is applied to control grid of tube 617 for each pulse interval containing delayed signaling pulse but the reception of an undelayed pulse prevents the application of such a pulse to tube 617. It will be recalled that the delayed pulses represent a "marking" condition or an "on" pulse, while the undelayed pulses represent an "off" pulse or "spacing" condition. Thus negative pulses applied to the grid of tube 617 correspond to pulses of current or potential repeated in the output circuits of tubes 514 and 515.

It will be apparent to persons skilled in the art that the delayed group instead of the undelayed group of received pulses may be employed to control the receiving equipment in the same or similar manner to that described above. In this case the code element timing pulses will be delayed so that they would coincide with the received delayed pulses instead of with the received undelayed pulses.

The negative pulses applied to the grid of tube 617 as described above are changed into positive pulses in the output circuit of this tube and applied to the control grid of tube 618. As pointed out hereinbefore the screen of tube 618 has applied to it the exponentially decreasing voltage for each code group of pulses received. As a result tube 618 causes the magnitude of each of the succeeding pulses of a code group repeated by it to be decreased.

The operation of the translating and decoding circuits as described above are further illustrated by graphs 940, 950 and 960. The solid lines in graph 940 represent the five pulses as received under the assumed set of conditions. In this case the first, third and fourth pulses are delayed while the second and fifth pulses are undelayed. The dotted lines for the first, third and fourth pulses represent the positions of undelayed pulses if these pulses had been undelayed. Graph 950 shows the pulses as applied to the control grid of tube 618. The solid lines represent the pulses of potential or current applied under the assumed conditions, while the dotted lines indicate the position of the pulses of opposite character in the second and fifth positions. Graph 960 illustrates the variation in magnitude of the pulses flowing in the output circuit of tube 618. As shown in graph 960 each of the succeeding pulses from tube 618 is of smaller amplitude and in the specific embodiment described herein, each of the pulses is of half the amplitude of the pulse of the preceding interval if that pulse is present. The amplitude of the respective pulses is the same independently of the character or nature of other pulses of any code group. The pulses of varying amplitude generated in the output circuit of tube 618 are transmitted through the low-pass filter 620 which removes the high frequency components therefrom and as shown in graph 970 in effect reconstructs the complex wave from these pulses. The low-pass filter 620 should be designed to have a cut-off somewhat above the highest frequency to be transmitted over the system.

The output of the low-pass filter 620 is then amplified by both sections of tube 621 and repeated to the terminal equipment of 623. Terminal equipment 623 is employed to provide a communication path to the receiving instrument 624 which is capable of receiving and responding to complex waves of the type generated by the source 410 associated with the transmitting terminal. As shown in the drawing, the receiving instrument comprises a telephone receiver or loudspeaker. The terminal equipment 623 corresponds to the terminal equipment 61 shown in Fig. 1 and may comprise any of the equipments mentioned with reference to equipment 61.

*Monitoring equipment*

The lower portion of Fig. 4 shows a typical form of monitoring equipment which operates similar to the decoding equipment described in my above-identified copending application. Each synchronizing pulse causes the upper terminal of condenser 467 to be charged to a high positive potential. Each of the code pulses are applied to the control grid of tube 461. The screen of tube 461 has the step wave form similar to curve 830 applied to its screen. As a result each of the pulses applied to the control element of tube 461 cause a portion of the charge upon the upper terminal of condenser 467 to be removed therefrom. The portion removed is determined by the screen potential of tube 461 so that after each code combination is received the upper terminal of condenser 467 will have a potential which is a function of the magnitude of the sample represented by the particular code combination. Tube 462 operates as a cathode follower tube and repeats the potential of the upper terminal of condenser 467 to the screen of tube 463. Tube 463 has applied to its control grid an undelayed synchronizing pulse. This pulse will consequently be received just before condenser 467 is recharged. The application of the synchronizing pulse to the control grid of tube 463 will thereupon cause a current to flow in the output circuit of tube 463 having a magnitude controlled by the potential of the upper terminal of condenser 467 after a complete code combination has been received. Consequently, the amplitude of the pulse flowing in the output circuit of tube 463 at this time will be a function of the amplitude of the sample which code combination it represents. These pulses of varying amplitude from tube 463 are then transmitted through the low-pass filter 464 which reconstructs the complex wave after which it is amplified by tubes 465 and 466 which repeat the reconstructed wave to the receiving device 469 which is capable of responding to complex waves generated by source 410. Thus the attendants at the transmitting station are able to check the operation of coding equipment.

Persons skilled in the art will understand that the type of decoding arrangements at the receiving terminal and for monitoring purposes at the transmitting terminal may be interchanged or they may be both of the same type. Also monitoring equipment of either type may also be employed at the receiving terminal.

What is claimed is:

1. Apparatus for decoding code groups of time modulated pulses representing a complex wave form comprising a source of locally generated pulses including a pulse for each pulse interval for each of the code groups of time modulated pulses, apparatus responsive to those received time modulated pulses which coincide in time with said locally generated pulses for suppressing said locally generated pulses, and apparatus responsive to unsuppressed locally generated pulses for reconstructing said complex wave form.

2. Apparatus for decoding code groups of time modulated pulses representing a complex wave form comprising a source of locally generated pulses including a pulse for each pulse interval for each of the code groups of time modulated pulses, apparatus responsive to those received time modulated pulses which coincide in time with said locally generated pulses for suppressing said locally generated pulses, apparatus responsive to unsuppressed locally generated pulses for reconstructing said complex wave form and apparatus for suppressing the received pulses of each code group which do not coincide with said locally generated pulses.

3. In a communication system for transmitting a message wave, means for periodically sampling the message wave, means for producing a code representative of each sample group of elements of a first permutation code, the elements of which comprise successive pulse intervals and are distinguished only by the absence or presence of pulses, means for producing an array of code element timing pulses one occurring at the time at which a pulse may occur in each of said intervals of the first permutation code, a comparator responsive to said array of code element timing pulses and to said code groups for transmitting one pulse of said array of pulses whenever such pulse occurs in the absence of a pulse in one of said pulse code groups and for preventing the transmission of a pulse of said array upon the simultaneous occurrence of a pulse in said array and a pulse in one of said code groups, a delay device having said pulse code groups supplied thereto, and means for combining the output of said comparator and the output of said delay device.

4. In a communication system for transmitting a message wave, means for periodically sampling the message wave, means for representing the amplitude of each sample of the message wave by a respective code group of pulses of a first permutation code, the code elements of which comprise successive pulse intervals and are distinguished by the absence or presence of pulses, means for producing a train of pulses one occurring at the time at which a pulse may occur in each pulse interval of the code group of said first permutation code, a comparator responsive to both said train of pulses and said code group of pulses for reproducing in its output a pulse of said train of pulses in the absence of a pulse at the corresponding time in said code group of pulses and for producing no output upon the coincident of a pulse from said train and from said code group of pulses, a delay device having a delay less than the length of said pulse intervals and having an input connected to receive said code groups of pulses, and means to combine the output of said comparator and said delay device to produce for each of said code groups of pulses a code group of pulses of a second permutation code having code element intervals corresponding to the intervals of the first code, but each containing a pulse and being distinguished by the time of occurrence of the pulse within the interval.

5. In a communication system for transmitting a message wave, means for periodically sampling the message wave, means for producing a permutation code group of elements indicative of the amplitude of each sample of the message wave, the code groups each comprising a pulse channel for each code element and differing from each other by the absence or presence of a pulse in respective pulse channels, means for producing a timing pulse in each pulse channel, and means for comparing the code elements with the timing pulses in the respective channels to produce a new code group having the same number of pulse channels each containing a pulse but differing in the time of occurrence of the pulse within the pulse channel.

6. In a communication system for transmitting a message wave, means for periodically sampling the message wave, means for producing a permutation code group of elements indicative of the amplitude of each sample of the message wave, the code groups each comprising a pulse channel for each code element and differing from each other by the absence or presence of a pulse in respective pulse channels, a source of timing pulses one for each pulse channel, a comparator responsive to both the code element pulses and the timing pulses and operating in accordance with the coincidence and the lack of coincidence of such pulses for producing a pulse under one of such conditions and at one time position in the respective pulse channel, and means for producing a pulse in another time position in the respective pulse channel in the absence of a pulse output from said comparator.

7. In a communication system for transmitting a message wave, means for periodically sampling the message wave, means for producing a code group of elements of a first permutation code representative of each sample, the elements of such code groups comprising successive pulse intervals and being distinguished only by the absence or presence of pulses, means for producing an array of code element timing pulses one occurring at the time at which a pulse may occur in each of said intervals of the first permutation code, a comparator responsive to said array of code element timing pulses and to said code groups and operating as a result of the conditions of coincidence and lack of coincidence of such pulses for producing a pulse under one of such conditions and at one time position in the respective pulse interval, means for delaying one of the pulse inputs to said comparator by a time equal to a fraction of the pulse interval, and means for combining the output of said comparator and the output of said means for delaying.

WILLIAM M. GOODALL.

REFERENCES CITED

The following references are of record in the file of this patent:

UNITED STATES PATENTS

| Number | Name | Date |
|---|---|---|
| 2,061,734 | Kell | Nov. 24, 1936 |
| 2,186,895 | d'Humy | Jan. 9, 1940 |
| 2,272,070 | Reeves | Feb. 3, 1942 |
| 2,413,023 | Young | Dec. 24, 1946 |
| 2,413,440 | Farrington | Dec. 31, 1946 |
| 2,416,306 | Grieg | Feb. 25, 1947 |
| 2,430,139 | Peterson | Nov. 4, 1947 |
| 2,453,461 | Schelleng | Nov. 9, 1948 |
| 2,458,734 | Reileer | Jan. 11, 1949 |

FOREIGN PATENTS

| Number | Country | Date |
|---|---|---|
| 647,468 | Germany | July 5, 1937 |